Feb. 26, 1952 — H. MEYER — 2,587,192

LEAKAGE TESTER FOR THREADED PIPE COUPLINGS

Filed July 6, 1948

INVENTOR.
HERMAN MEYER
BY
ATTORNEY.

Patented Feb. 26, 1952

2,587,192

UNITED STATES PATENT OFFICE 2,587,192

LEAKAGE TESTER FOR THREADED PIPE COUPLINGS

Herman Meyer, Long Beach, Calif.

Application July 6, 1948, Serial No. 37,247

4 Claims. (Cl. 73—46)

This invention relates to a leakage tester for threaded pipe couplings in which the area at and adjacent to the threaded coupling may be tested to determine if there is a leakage in the pipe coupling or threads at this point. I have determined that in oil well drill pipe and tubing, that the leakages usually occur around the pipe couplings in the threads of the pipe or coupling, or immediately above or below the coupling.

An object of my invention is to provide a novel leakage tester for threaded pipe couplings, including two or more packings which are squeezed around the pipe at spaced intervals so that a pressure tester can be applied to the pipe between the packings.

Another object of my invention is to provide a novel leakage pipe tester for threaded pipe couplings in which the packing member is squeezed inwardly against the pipe by engaging a tapered seat, and further, in which the packing is caused to squeeze inwardly against the pipe by a slight downward movement of the packing on its seat.

Another object of my invention is to provide a novel tester of the character stated in which slips or pipe gripping means are provided and connected to the packing members, this pipe gripping means engaging the pipe and pulling the packing downwardly and inwardly against the pipe on slight downward movement of the pipe to be tested.

A feature of my invention is to provide a novel tester of the character stated through which the pipe continuously moves as it is being withdrawn from or run into the well, thus enabling the operator to test any or all of the threaded joints.

Still another feature of my invention is to provide a tester of the character stated which will rapidly and effectively test the pipe couplings or other sections of the pipe as the pipe is being moved in the well.

Other objects, advantages and features of invention may appear from the accompanying drawing, the subjoined detailed description and the appended claims.

Figure 1:
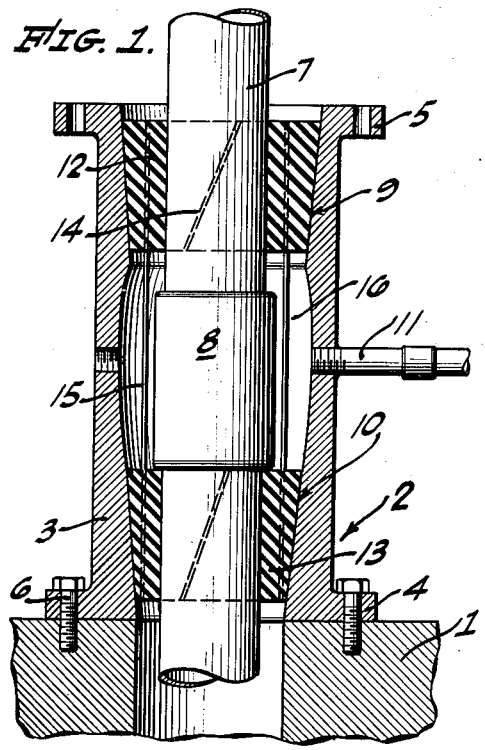
Figure 1 is a longitudinal sectional view of my tester in position on a section of pipe.

Referring more particularly to the drawing, the numeral 1, indicates a suitable stationary portion of an oil well, for example, the drilling table, a flow head or some other fixed element at the top of the well. My tester 2, includes a cylindrical body 3, provided with a flange 4, at the lower end, and a similar flange 5, at the upper end. The flange 4, is bolted to the stationary member 1, by means of bolts or studs, 6. The pipe 7, extends through the tubular housing 3, as shown, and this pipe is made up with a plurality of stands, each stand or pipe section being connected by a threaded coupling 8. It is this coupling 8, and the pipe sections adjacent to it which cause leakage in the pipe string, and it is this area that I propose to test.

Considering first the modification shown in Figure 1, the housing 3 is provided with an internal tapered seat 9, adjacent the upper end, and a second tapered seat 10, adjacent the lower end thereof. These seats are spaced so that the coupling 8, can be positioned between them. A pipe 11, carrying fluid under pressure, extends into the housing 3, between the seats 9 and 10. The purpose of introducing the fluid under pressure between these seats will be subsequently described.

An annular packing 12, rests on the seat 9, and is preferably tapered to conform with the taper of the seat. A second annular packing 13, rests on the seat 10, and preferably conforms with the taper of this seat. The packings 12 and 13 are each split as shown at 14, so that they can be opened for the purpose of encircling the pipe 7. A plurality of straps 15, are embedded in the packings 12 and 13, and connect these packings.

In operation, the housing 3, is bolted to the stationary member 1, and the pipe 7, is pulled upwardly through it. When a coupling 8, appears, the packings 12 and 13, are placed around the pipe above and below the coupling, and the pipe is then lowered slidably with the packing 12, engaging the seat 9, and the packing 13 engaging the seat 10. The coupling 8 will briefly rest on the lower packing 13, as shown, and when weight is placed on the tester by moving the pipe 7, downwardly, a slight amount, the coupling 8 will press the packing 13, tightly against its seat and will squeeze the packing inwardly. The straps 15, will also pull the packing 12 downwardly, and simultaneously squeeze this packing inwardly around the pipe. The area above and below the coupling 8, is now sealed and pressure is now exerted in the space 16, by introducing fluid under pressure through the pipe 11. This pressure is gauged by a pressure gauge extending into the housing 3 (not shown) and if there is a loss of pressure, leakage is indicated. As soon as one coupling has been tested, the pipe 7, is again drawn upwardly until the next coupling appears, when the test is repeated.

Figure 2:
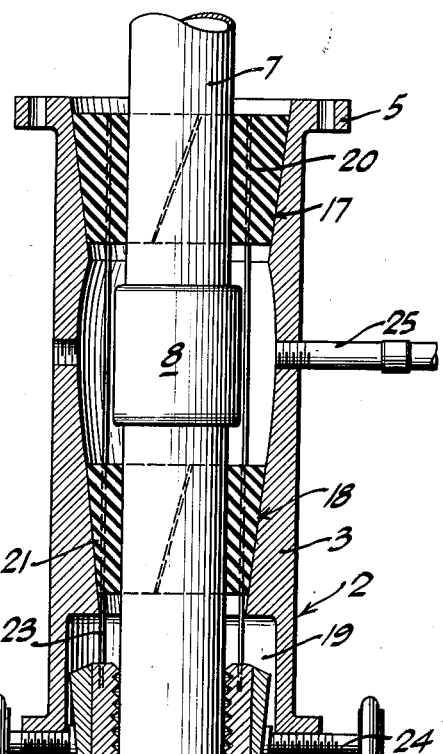
Figure 2 is a longitudinal sectional view of a modified form of tester.

In Figure 2, the housing 3, includes an upper tapered seat 17, a lower tapered seat 18, and a slip housing 19, adjacent the bottom of the housing. An upper annular packing 20, engages the seat 17, a lower annular packing 21, engages the seat 18, and slips 22, are mounted in the space 19. The slips 22, are each connected to the packing 20 and 21, by means of a plurality of straps 23. The slips 22, are controlled in their inward and outward movement by suitable manual operating means 24. In this modification, the slips 22, grip the pipe 7, and slight downward movement of this pipe will press the packings 20 and 21 against their respective seats, and squeeze these packings inwardly around the pipe to seal the space above and below the coupling 8. Pressure is again introduced around the coupling through the pipe 25, the same as previously described. The operation of this device is the same as described under Figure 1.

Figure 3:
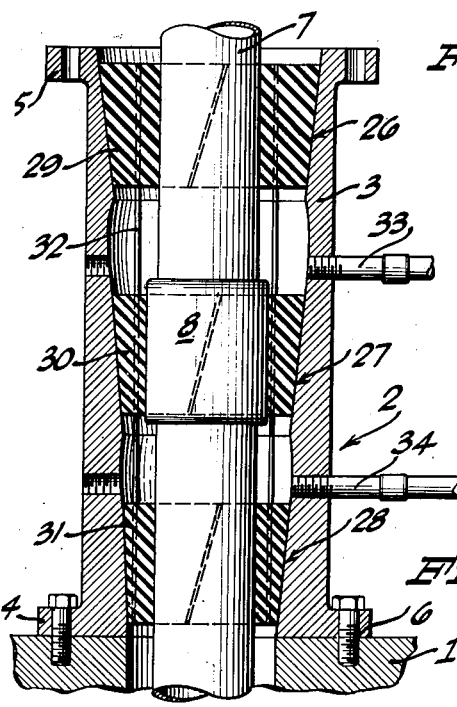
Figure 3 is a longitudinal sectional view of still another modification of my tester.
Figure 4:
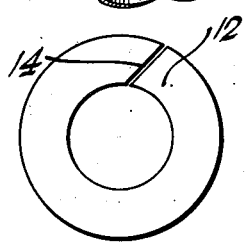
Figure 4 is a top plan view of one of the packing members.

In Figure 3, I have shown a modification in which the threads above and below the coupling 8, can be individually tested. The housing 3, is provided with an upper tapered seat 26, a central tapered seat 27, and a lower tapered seat, 28. An annular split packing 29, rests on the seat 26, an annular split packing 30, rests on the seat 27, and an annular split packing 31, rests on the seat 28. These packings are all connected by a plurality of straps 32, which cause all of them to move in their respective seats, and squeeze inwardly around the pipe. A pipe 33, carries fluid under pressure in the area above the coupling 8, and a second pipe 34, carries fluid under pressure to the area below the coupling. Thus, it is possible to individually test the area above and below the coupling 8.

Having described my invention, I claim:

1. A leakage tester for threaded pipe couplings comprising a tubular housing, spaced seats in said housing, an annular packing encircling the pipe adapted to rest on each of said seats, said housing, seats and packing being vertically arranged, said seats being coaxial with the pipe to be tested, and a pressure conduit extending into said housing between said seats, and slips in said housing below the packing and engageable with the pipe, and straps attached to said slips and each of said packings.

2. A leakage tester for threaded pipe couplings comprising a tubular housing, spaced tapered seats in said housing the smallest diameter of said seats being sufficiently large to permit passage of the pipe, split and annular packing adapted to rest on each of said seats, said housing, seats and packing being vertically arranged, said seats being coaxial with the pipe to be tested, said packing frictionally engaging the pipe, and pressed against the pipe by engagement with the tapered seat, and straps attached to said packings, and a pressure conduit extending into said housing between said seats.

3. A leakage tester for threaded pipe couplings comprising a tubular housing, spaced tapered seats in said housing the smallest diameter of said seats being sufficiently large to permit passage of the pipe, split and annular packing adapted to rest on each of said seats, said housing, seats and packing being vertically arranged, said seats being coaxial with the pipe to be tested, said packing frictionally engaging the pipe, and pressed against the pipe by engagement with the tapered seat, and straps attached to said packings, and slips engaging the pipe and positioned below the lower packing, and means coupling said slips to the packing, and a pressure conduit extending into said housing between said seats.

4. A leakage tester for threaded pipe couplings comprising a tubular housing surrounding said couplings, vertically spaced tapered seats in said housing the smallest diameter of said seats being sufficiently large to permit passage of the pipe, an annular packing resting on each of said seats, said housing, seats and packing being vertically arranged, said seats being coaxial with the pipe to be tested, said packing frictionally engaging the pipe and pressed against the pipe by engagement with the tapered seats, straps secured to and connecting said packings, slips engaging the pipe and positioned below the lower packing, said straps being attached to the slips, and a pressure conduit extending into said housing between said seats.

HERMAN MEYER.

REFERENCES CITED

The following references are of record in the file of this patent:

UNITED STATES PATENTS

| Number | Name | Date |
|---|---|---|
| 1,221,733 | Henderson | Apr. 3, 1917 |
| 1,867,321 | McEvoy | July 12, 1932 |
| 1,914,472 | Wickersham | June 20, 1933 |
| 2,054,336 | Penick et al. | Sept. 15, 1936 |
| 2,079,646 | Abegg | May 11, 1937 |
| 2,255,921 | Fear | Sept. 16, 1941 |
| 2,481,013 | Henderson | Sept. 6, 1949 |